United States Patent [19]

Börger et al.

[11] 4,135,891
[45] Jan. 23, 1979

[54] PURIFYING EXHAUST GASES CONTAINING ORGANIC AND INORGANIC MATERIALS

[75] Inventors: Gotz-Gerald Börger, Monheim; Adam Jonas, Leichlingen; Rolf Germerdonk, Bergisch Gladbach, all of Germany

[73] Assignee: Bayer Aktiengesellschaft, Leverkusen, Germany

[21] Appl. No.: 841,235

[22] Filed: Oct. 11, 1977

[30] Foreign Application Priority Data

Oct. 29, 1976 [DE] Fed. Rep. of Germany ....... 2649269

[51] Int. Cl.² ...................... B01D 53/04; B01D 53/14
[52] U.S. Cl. .......................................... 55/59; 55/71; 55/74; 55/89; 55/DIG. 30
[58] Field of Search ................... 55/59, 61, 68, 70, 71, 55/74, 75, 89, DIG. 30; 423/212, 240, 245

[56] References Cited

U.S. PATENT DOCUMENTS

| | | | |
|---|---|---|---|
| 1,510,373 | 9/1924 | Backhaus | 55/68 |
| 1,815,554 | 7/1931 | Engelhardt | 55/59 |
| 1,936,078 | 11/1933 | Adamson | 55/71 X |
| 2,750,002 | 6/1956 | Hooker et al. | 55/71 X |
| 3,331,189 | 7/1967 | Worley | 55/74 X |
| 3,368,325 | 2/1968 | Sanders | 55/59 |
| 3,755,989 | 9/1973 | Fornoff et al. | 55/74 X |
| 4,021,211 | 5/1977 | Turek et al. | 55/59 X |

FOREIGN PATENT DOCUMENTS 2518728  11/1976  Fed. Rep. of Germany ............. 55/59

Primary Examiner—Robert H. Spitzer
Attorney, Agent, or Firm—Sprung, Felfe, Horn, Lynch & Kramer

[57] ABSTRACT

The invention relates to separately removing organic and inorganic impurities from exhaust gases so that the recovered materials are relatively pure and re-usable, using adsorption on carbon for selective removal of the organics and absorption in aqueous media for the inorganics. Carbon is first saturated with the same inorganics so that, when contacted with the exhaust gas, it removes only the organics. The residual gas, free of organics, upon absorption gives an inorganic solution of high purity. Steam regeneration of the carbon liberates the volatile organics. Systems are described using the two carbon beds in series, the second of which is undergoing inorganic presaturation while the first is removing the organics.

4 Claims, 1 Drawing Figure

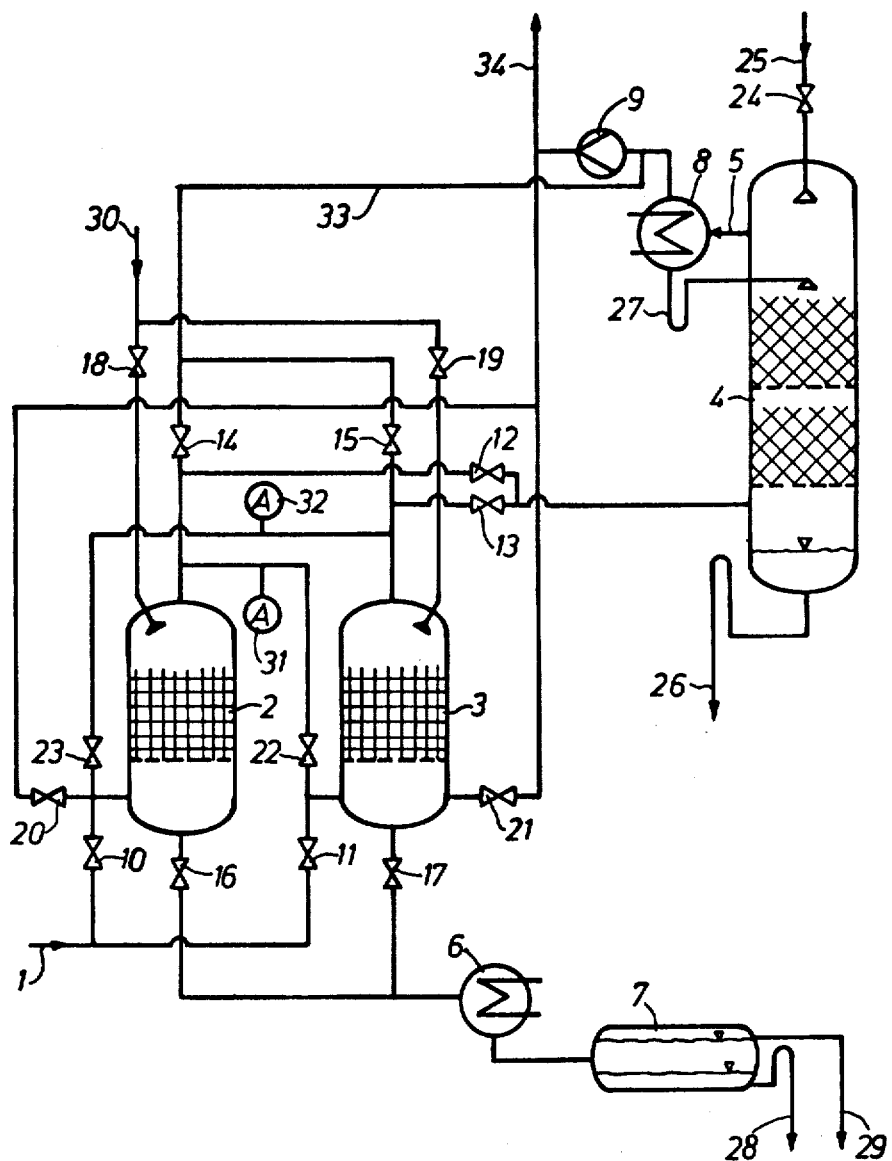

PURIFYING EXHAUST GASES CONTAINING ORGANIC AND INORGANIC MATERIALS

This invention relates to a process for reacting inorganic acid or basic substances present in exhaust air streams by absorption with aqueous solution to form useful chemicals of commercial purity, the troublesome organic substances being removed from the exhaust air beforehand by adsorption.

Various chemical processes such as, for example, the chlorination or organic substances or the Bucherer reaction produce streams of waste air which, in addition to organic substances, contain relatively large amounts of inorganic acid substances (for example hydrogen chloride or sulphur dioxide) or basic substances (for example ammonia). For ecological and economic reasons, there is considerable interest in reacting these inorganic substances to form useful chemicals of commercial purity to enable them to be recycled for production purposes. In one known process developed for this purpose, the inorganic substances are washed out of the exhaust gas with aqueous solutions in absorption apparatus, for example hydrogen chloride or ammonia with water or sulphur dioxide with aqueous sodium hydroxide solution. The solutions running off from the absorbers are required to have certain minimum concentrations to be able to be used as recycle chemicals (for example 30% of hydrochloric acid, 40% of sodium hydrogen sulphite solution and 25% of ammonia water). In addition, to obtain generally useable recycle chemicals, the content of other substances washed out with the exhaust air in these solutions must not exceed certain limits. This applies in particular to the permissible content of organic substances in the recycle chemicals. For example, the content of organic substances in generally useable 30% recycle hydrochloric acid is limited to between 10 and 15 mg/l.

If the above-mentioned streams of exhaust air contain relatively large amounts of organic substances, these limits can only be observed in the recycle chemicals if
(a) the recycle chemicals are subsequently purified, or
(b) the adsorption conditions can be adjusted in such a way that the organic substances are only co-adsorbed in the permitted traces, or
(c) the organic substances are previously removed from the exhaust air.

Processes based on (a) involve additional process steps and hence costs, in addition to which new sources are thus created for the emission of inorganic substances. Processes based on (b) can only be applied under certain conditions. They cannot be applied in cases where the organic substances are highly soluble in water, react in the washing solution and accumulate in high or highly fluctuating concentrations. Since in general not only the inorganic substances but also the organic substances have to be removed from the exhaust air by a special exhaust-air purification process, processes based on (c) have the advantage that no additional effort is thus required for purifying the exhaust air. On the other hand, however, it is known that, in the presence of the inorganic acid or basic substances present at least periodically in high concentrations, the controlled removal of only the organic substances from these exhaust air streams has hitherto never been completely possible.

Accordingly, there was a need to develop a versatile process by which organic substances, including in particular mixtures, can be economically removed down to very small traces from exhaust air streams when the exhaust air simultaneously contains inorganic acid or basic pollutants in relatively high concentrations.

Accordingly, the present invention provides a process for purifying exhaust air streams containing inorganic acid or basic substances together with organic substances by absorption of the inorganic substances in aqueous solutions and adsorption of the organic substances on active carbon, wherein
   (a) the exhaust air is initially contacted with active carbon which has been presaturated with the inorganic substances simultaneously present in the exhaust air with simultaneous dissipation of the heat of adsorption liberated, and
   (b) the inorganic substances are subsequently removed by absorption from the exhaust air thus freed from organic substances.

In one preferred embodiment of the process according to the invention, adsorption of the organic constituents and absorption of the inorganic constituents from the exhaust air are carried out in stages by
   (aa) initially contacting the exhaust air with active carbon which has been presaturated with the inorganic substances simultaneously present in the exhaust air with simultaneous dissipation of the heat of adsorption liberated,
   (bb) subsequently contacting the exhaust air thus freed of organic substances with more active carbon, this active carbon being presaturated with the inorganic substances still present in the exhaust air with simultaneous dissipation of the heat of adsorption liberated,
   (cc) subsequently removing the inorganic substances from the exhaust air by absorption, and
   (dd) on reaching the adsorption capacity of the active carbon present in process step (aa), regenerating this active carbon with steam to remove the adsorbed inorganic and organic substances and subsequently presaturating the regenerated active carbon by the gradual addition of exhaust air containing only the inorganic substances which is obtained at the end of process step (bb), the unpurified exhaust air then being contacted for the first time in process step (bb) with the active carbon presaturated with inorganic substances.

In one particularly preferred embodiment of the process according to the invention,
   (a') the exhaust air is initially passed through a first active carbon adsorption tower which has been presaturated with the inorganic substance or mixture of inorganic substances simultaneously present in the exhaust air with simultaneous dissipation of the heat of adsorption liberated,
   (b') the exhaust air now free of organic substances is passed through another following adsorption tower which has been regenerated by steaming out the organic pollutants and subsequently cooled and blown dry by introducing the fully purified exhaust air leaving the absorption column for the inorganic substances, or fresh air, and then presaturated by the gradual addition of air which still contains the inorganic substances,
   (c') the inorganic substances are subsequently removed in known manner from the exhaust air in an absorption apparatus, for example a packed column, to which the washing water or the aqueous solution is delivered according to the accumulation of inorganic acid or basic substances in the exhaust gas, (d') on reaching the adsorption capacity of the first adsorption tower (a') in the direction of flow of the exhaust air, this adsorption tower is regenerated with steam, subsequently blown dry and cooled with fresh air, preferably with the exhaust air which issues from the absorption apparatus (c') and is recirculated, and subsequently presaturated by the gradual addition of exhaust air containing only the inorganic pollutants, the unpurified exhaust air subsequently passing directly through the adsorption tower (b') presaturated with the inorganic substances, and (e') after regeneration, blowing dry and cold, and presaturation with the inorganic substances of the adsorption tower described in (a') and (d'), this adsorption tower is then connected up between the tower (b') now used for adsorption of the organic pollutants and the absorption apparatus mentioned in (c').

In the process according to the invention, the active carbon used as adsorbent in the adsorption towers is prevented from being excessively heated, which would result in inadequate adsorption of the organic substances. At the same time, the organic substances are prevented from igniting on the active carbon itself which is strongly heated by liberation of the heat of adsorption of the inorganic substances, which would endanger the entire installation. In addition, it is possible for all the organic substances to be continuously removed from the exhaust air, even in the event of fluctuations in the various foreign substance concentrations, to such an extent that the recycle chemicals obtained from the inorganic substances accumulate in sufficiently pure form.

One advantage of the process according to the invention in its particularly preferred embodiment, which will be discussed in more detail hereinafter, is that only a relatively insensitive and, hence, operationally reliable and inexpensive measuring process is required for detecting the reaching of the adsorption capacity of the adsorption towers provided for process step (a') behind the last active carbon tower provided for process step (a'). This is because any traces of organic substances getting through, to which the measuring process does not respond, are adsorbed in the adsorption tower or towers provided on the exhaust air side for process step (b'). At the same time, this means that it is possible with this relatively simple and inexpensive measuring process to remove the inorganic substances to a very large extent and hence also to obtain very pure recycle chemicals.

In general, one adsorption tower is sufficient both for process step (a') and for process step (b'). If, under particularly adverse operating conditions (for example a high ratio of organic to inorganic pollutants), the times required for regeneration and presaturation become so long that the adsorption capacity of the active carbon layer, which is intended to adsorb the organic pollutants, is inadequate, it is also possible, for example, to use three active carbon towers which can be switched around correspondingly in accordance with the invention. In that case, two towers are regenerated or precharged in process step (b'), leaving one tower with a high adsorption capacity permanently available for process step (a').

In the context of the preferred embodiment of the invention, regeneration by steaming out in accordance with process step (d') is intended to mean that steam, preferably steam superheated by 10° to 50° C., is passed downwards through the charged active carbon, and the mixture of steam, organic vapors and hydrogen chloride or hydrochloric acid vapor issuing downwards from the active carbon layer is subsequently condensed. Steam is passed through the active carbon to be regenerated until the organic substances on the carbon have been almost completely desorbed. The permitted residual charge is determined by the required purity of the inorganic recycle chemicals recovered.

Blowing dry and/or cooling in accordance with process step (b') may be carried out with purified recirculated exhaust air and/or fresh air, preferably with a low water content below 20 g/m$^3$, which may optionally be preheated. Recirculated exhaust air is preferably used for this purpose.

The adsorption process corresponding to process step (c') may be carried out with standard adsorption apparatus, for example packed columns, to which the washing water or the aqueous solution required for adsorption is delivered in known manner corresponding to the accumulation of inorganic acid or basic substances. Accordingly, reuseable inorganic recycle chemicals free from organic pollutants are formed in this absorption step.

It has been found that the adsorption capacity of the active carbon for organic substances is not significantly affected after charging with inorganic, readily volatile substances. For example, the capacity of active carbon for methyl-i-butyl ketone is only about 30% lower when the exhaust air additionally contains 250 g/m$^3$ of hydrogen chloride and when the active carbon has been presaturated while cooling with an exhaust air stream, free from organic substances, containing only 250 g/m$^3$ of the hydrogen chloride.

The particularly preferred embodiment of the process according to the invention is described with reference to the accompanying drawing which is a flow sheet of the process wherein the reference numerals used have the following meaning:

1 exhaust air charged with inorganic and organic substances;
2, 3 adsorption towers filled with active carbon;
4 absorption tower (packed column);
5 exhaust air exit from absorption tower;
6 condenser for vapor mixture of regenerating steam and organic vapors;
7 separating tank for separating the inorganic substances from the organic substances;
8 condenser for steam;
9 exhaust air fan;
10–21 reversing valves;
22, 23 valves for the gradual presaturation of the active carbon with inorganic substances which are present in the exhaust air;
24 regulating valve for delivery of the absorption liquid (for example water);
25 absorption liquid (for example water for hydrogen chloride);
26 outlet for the inorganic recycle chemicals;
27 outlet for the condensate;
28 outlet for the organic constituents which were originally present in the exhaust air;
29 outlet for part of the inorganic constituents which were originally present in the exhaust air;

30 regenerating steam;
31, 32 analysis for organic constituents in the exhaust air;
33 purified exhaust gas for regenerating process;
34 exhaust gas exit.

Referring now more particularly to the drawing, in a specific example exhaust air, containing 10 g of chlorobenzene per cubic meter of exhaust air (organic exhaust air constituent) and 150 g of hydrogen chloride per cubic meter of exhaust air (inorganic exhaust air constituent) and having a steam content of less than 1 g per cubic meter of exhaust air, is introduced at (1). Initially, the active carbon in the two adsorption towers (2) and (3) is charged with hydrochloric acid and hydrogen chloride (about 15 to 30 g, e.g. 22 g, of HCl/100 g of active carbon) corresponding to a partial pressure of 150 g of hydrogen chloride and the residual moisture (water) content to be obtained during the regeneration cycle described hereinafter (process step d'), followed by cooling and drying. The reversing valves are set in position (A) in Table 1. The exhaust air (1) then flows successively through the two adsorption towers (2) and (3), the chlorobenzene being adsorbed on the active carbon of tower (2) with partial displacement of the hydrogen chloride.

The exhaust air containing 150 g of hydrogen chloride per cubic meter in addition to less than 10 mg of chlorobenzene per cubic meter is then freed from the hydrogen chloride to a residual charge of 100 mg of hydrogen chloride per cubic meter in the adiabatic countercurrent column (4). To this end, 0.62 kg of water per cubic meter of exhaust air, in addition to the condensate (27) of low hydrochloric acid content, is delivered to the head of the column (4) at (25) through the inlet valve (24) in known manner (W. M. Ramm, Adsorptionsprozesse in der chemischen Technik, VEB-Verlag Technik Berlin, 1953, 2nd Edition, pages 359 et seq). 0.833 kg of 30% hydrochloric acid per cubic meter flow off from the column at (26) (chlorobenzene content less than 20 mg per liter). The steam formed in column (4) during the adiabatic absorption of the hydrogen chloride is deposited in the condenser (8) to a residual vapor pressure corresponding to 30° C. (0.036 kg per cubic meter of exhaust air). The purified exhaust air is then released into the atmosphere at (34) by means of the fan (9). When the analyzer (31) shows a chlorobenzene charge of approximately 0.5 g per cubic meter of exhaust air, the valves are switched to position B (Table 1). Accordingly, the exhaust air (1) flows directly into the adsorption tower (3) which hitherto has only adsorbed traces of chlorobenzene and which therefore removes the chlorobenzene from the exhaust air to a maximum residual content of 10 mg/m³ for the duration of the regeneration cycle described hereinbelow (up to position E).

At the same time, the chlorobenzene and most of the adsorbed hydrogen chloride are removed from the adsorption tower (2) with the regenerating steam (30) in accordance with process step (d'). The vapor mixture is precipitated in the condenser (6) and separated in the separation tank (7) into an organic phase (28) saturated with hydrochloric acid and an inorganic phase (29) saturated with chlorobenzene which can then be suitably further processed.

On completion of the regeneration step B (according to Table 1), the valves are switched to position C (Table 1). Accordingly, the active carbon in the adsorption tower (2) is blown dry and cold in accordance with process step (d') until the temperature of the active carbon has reached approximately 35° to 40° C. The carbon is then charged with 20 to 30 g, e.g. about 25 g, of heavily diluted hydrochloric acid per 100 g of active carbon.

The active carbon in the adsorption tower (2) is then presaturated with hydrogen chloride in position D in accordance with process step (d'). However, the adjusting valve (23) is only opened gradually so that the increase in temperature attributable to liberation of the heat of adsorption of the hydrogen chloride in the active carbon remains minimal. In this way, the temperature of the active carbon in the adsorption tower (2) is always below 70° C. when the hydrogen chloride flows through the adsorption tower. The first stage of the presaturation process is completed with the adjusting valves (23) fully open when the temperatures at the top and bottom of the active carbon layer of the adsorption tower (2) have become substantially equal (the temperatures at the top and bottom of the adsorption tower show maximum deviations of approximately 5° C.).

The following switch to position E in accordance with process step (e') produces complete presaturation of the active carbon in the adsorption tower (2) with hydrogen chloride. Since, in this example, the recirculated purified exhaust gas (33) is very dry, the carbon is simultaneously dried. In this second presaturation stage, the temperature in the active carbon layer also remains below 70° C. on account of the precharging in position D.

After complete presaturation and cooling/drying, the operating cycle in position E changes continuously without further change-over into the operating cycle at the beginning of position A, the adsorption towers (2) and (3) having changed their functions.

Similarly, when the analyzer (32) shows that 0.5 g of chlorobenzene is present per cubic meter of exhaust air, there follows the change-over F to regeneration of the adsorption tower (3) followed by blowing dry and cold, corresponding to position G, and the first presaturation stage corresponding to position A.

The following switching stage A effects first the second stage of the presaturation process and then the gradual change-over to the original operating cycle, i.e. the closed cycle.

In addition to the mode of operation described in this example, other variations are of course also possible. For example, it is possible, instead of delivering purified steam-saturated recirculated exhaust air (33), to deliver dry fresh air through the valves (20) and (31) in the positions, C, D, G and H. The advantage of this is that less water is adsorbed on the active carbon during presaturation with hydrogen chloride and that there is no need for any additional throttle means in the pipes (12) and (13) in the valve positions D and H. However, the larger accumulation of exhaust air at (34) is a disadvantage. The fresh air may even be preheated.

Another variant is to use adjusting valves instead of reversing valves at 12 and 13 and to synchronize the closure of (12) and (13) with the gradual opening of (22) and (23).

If the exhaust gas contains several inorganic pollutants, for example hydrogen chloride and sulphur dioxide, these pollutants, instead of being reacted in an adsorption tower (4), may be reacted in known manner by selective multistage washing processes to form various useful chemicals, for example hydrochloric acid and sodium hydrogen sulphite solution each of commercial purity. This does not in any way alter the process according to the invention for presaturating the active carbon towers.

Table 1

| Position | Reversing Valves | | | | | | | | | | | Adjusting valves | | |
|---|---|---|---|---|---|---|---|---|---|---|---|---|---|---|
| | 10 | 11 | 12 | 13 | 14 | 15 | 16 | 17 | 18 | 19 | 20 | 21 | 22 | 23 |
| A | A | Z | Z | A | Z | Z | Z | Z | Z | Z | Z | Z | A | Z |
| B | Z | A | Z | A | Z | Z | A | Z | A | Z | Z | Z | Z | Z |
| C | Z | A | Z | A | A | Z | Z | Z | Z | Z | A | Z | Z | Z |
| D | Z | A | A | A | Z | Z | Z | Z | Z | Z | A | Z | Z | Z→A |
| E | Z | A | A | Z | Z | Z | Z | Z | Z | Z | Z | Z | Z | A |
| F | A | Z | A | Z | Z | Z | Z | A | Z | A | Z | Z | Z | Z |
| G | A | Z | A | Z | Z | A | Z | Z | Z | Z | Z | A | Z | Z |
| H | A | Z | A | A | Z | Z | Z | Z | Z | Z | Z | A | Z→A | Z |
| A | A | Z | Z | A | Z | Z | Z | Z | Z | Z | Z | Z | A | Z |

It will be appreciated that the instant specification and claims are set forth by way of illustration and not limitation, and that various modifications and changes may be made without departing from the spirit and scope of the present invention.

What is claimed is:

1. A process for purifying exhaust air streams which contain inorganic acid or basic substances together with organic substances, by absorption of the inorganic substances in aqueous solutions and adsorption of the organic substances on active carbon, comprising
   (a) presaturating active carbon with the inorganic substances present in the exhaust air with simultaneous dissipation of the heat of adsorption liberated, and
   (b) contacting the exhaust air stream with said active carbon, thereby selectively to adsorb the organic substances and leave residual exhaust air,
   (c) contacting the residual exhaust air with an absorbent for the inorganic substances, the resulting absorbent being substantially free of said organic substances.

2. A process as claimed in claim 1, wherein
   (a) of claim 1 between contact of the exhaust air with active carbon and with said absorbent, the exhaust air is contacted with additional active carbon presaturated with the inorganic substances still present in the exhaust air, and
   (b) on reaching the adsorption capacity of the first active carbon present in process step (a) the first active carbon is regenerated with steam to remove the adsorbed inorganic and organic substances, and
   (c) the regenerated first active carbon is subsequently presaturated by the gradual addition of exhaust air containing only the inorganic substances which is obtained at the end of the contact with the additional active carbon, (d) the unpurified exhaust air then being contacted for the first time with the additional active carbon presaturated with inorganic substances.

3. A process as claimed in claim 1, wherein
   (a) the active carbon of step (b) of claim 1 is in the form of a first active carbon adsorption tower which has been presaturated with the inorganic substances according to step (a) of claim 1,
   (b) the exhaust air now free of organic substances is passed through a second adsorption tower which has been regenerated by steaming out the organic pollutants and subsequently cooled and blown dry, and then presaturated by the gradual addition of air still cintaining the inorganic substances,
   (c) the inorganic substances are subsequently absorbed from the exhaust air from step (b) in an absorption apparatus with aqueous absorbent,
   (d) on reaching the adsorption capacity of the active carbon in the first adsorption tower in the direction of flow of the exhaust air, this carbon is regenerated with steam, subsequently blown dry and cooled and subsequently presaturated by the gradual addition of exhaust air containing only the inorganic pollutants, the unpurified exhaust air subsequently passing directly through the second adsorption tower presaturated with the inorganic substances, and
   (e) after regeneration, blowing dry and cold, and presaturation with the inorganic substances of the active carbon of the first adsorption tower it is then arranged serially between the second tower now used for adsorption of the organic pollutants and the absorption apparatus.

4. A process as claimed in claim 3, wherein fresh air of low water content is used for blowing dry and cooling the active carbon following regeneration according to step (b) of claim 3.

* * * * *